US005914473A

United States Patent [19]

Gresky

[11] Patent Number: 5,914,473

[45] Date of Patent: Jun. 22, 1999

[54] METHOD OF SCANNING BAR CODES OF BULKY ITEMS

[76] Inventor: David A. Gresky, 4205 Alamo Ave., Fort Worth, Tex. 76107

[21] Appl. No.: 08/937,490

[22] Filed: Sep. 25, 1997

Related U.S. Application Data

[60] Provisional application No. 60/026,773, Sep. 26, 1996.

[51] Int. Cl.[6] .......... G06K 15/00

[52] U.S. Cl. .......... 235/383; 235/462

[58] Field of Search .......... 235/383, 462

[56] References Cited

U.S. PATENT DOCUMENTS 4,114,033 9/1978 Okamoto et al. .

5,241,467 8/1993 Railing et al. .......... 235/383

5,382,779 1/1995 Gupta .

5,426,282 6/1995 Humble .

*Primary Examiner*—Harold I. Pitts

*Attorney, Agent, or Firm*—James E. Bradley

[57] ABSTRACT

A method of checking out bulky products at a retail check-out counter having a stationary countertop bar code scanner alleviates having to lift heavy or bulky products onto the counter. Cards are assembled into a booklet that allows them to fold out. Each of the cards has a bar code and the name of one of the bulky products. When a bulky product is brought by a purchaser to the check-out counter, the clerk identifies the particular card, folds it out from the booklet and moves the card over the scanner.

10 Claims, 2 Drawing Sheets

METHOD OF SCANNING BAR CODES OF BULKY ITEMS

This Application claims benefit of Provisional Application No. 60/026,773 filed Sep. 26, 1996.

TECHNICAL FIELD

This invention relates in general to methods of using bar code scanners in retail stores, and in particular to a method which avoids having to lift heavy or bulky products onto a check-out counter.

BACKGROUND ART

In many retail establishments, products are checked out with a bar code scanner. The scanner may be a countertop type, which is stationary and typically used in grocery stores. Alternately, the scanner may be a wand or a gun, each of which is handheld and connected to an electronic system by a cord. The main difference between the wand and the gun is that a trigger needs to be pulled before reading with a gun.

One of the problems with checking out various items in many retail stores is that the checker or clerk must handle each item in order to scan price information labeled on the products by means of bar codes. The bar code provides unit and price information which can be read and stored with conventional scanning equipment. Scanning bulky items presents problems. The bulky items may be bulk items in sacks such as dry dog food, fertilizer and the like. The bulky items may also be 18 and 24 unit cartons of beverages. If the store has only a stationary countertop bar code reader, the clerk must lift the product and maneuver it over the bar code reader. The bulky products are often brought to the check-out counter on a lower level of a cart. This requires the clerk to lift the product from a low level, risking a back injury. Also, the procedure is time consuming. Even if a wand or gun is used, it requires the clerk to bend over and often turn the product over or on its side for access to the bar code. Sometimes the cord will not be long enough to allow a wand or gun to reach the product on the cart without repositioning the cart. Also, if the register already has a stationary countertop bar code scanner, the addition of a gun or a wand for heavy items adds extra expense and maintenance.

In some hardware stores selling bulk items such as nails and screws, the clerk may have a book containing pictures of the various nails alongside a bar code. The clerk identifies the nails and moves the bar code wand across the bar code. This is helpful for unmarked items, but does not help the clerk with bulky or heavy products which are marked with a bar code.

SUMMARY OF INVENTION

In this invention, a binder containing a plurality of cards is kept at the check-out counter. Each of the cards is marked with a bar code corresponding to a single bulky or heavy product. Each card has a tab which is visible and marked with an identifier readily visible to the clerk. The identifier is preferably the name of the product.

When presented with a bulky product, the clerk reads the tabs and picks the card associated with that product. The clerk exposes the particular card and moves it over the bar code scanner to read the information. Preferably, the bar code and identifier are on an adhesive label attached to the card. This enables the cards to be reused if a product is discontinued or seasonal.

BEST MODE FOR CARRYING OUT THE INVENTION

Figure 1:
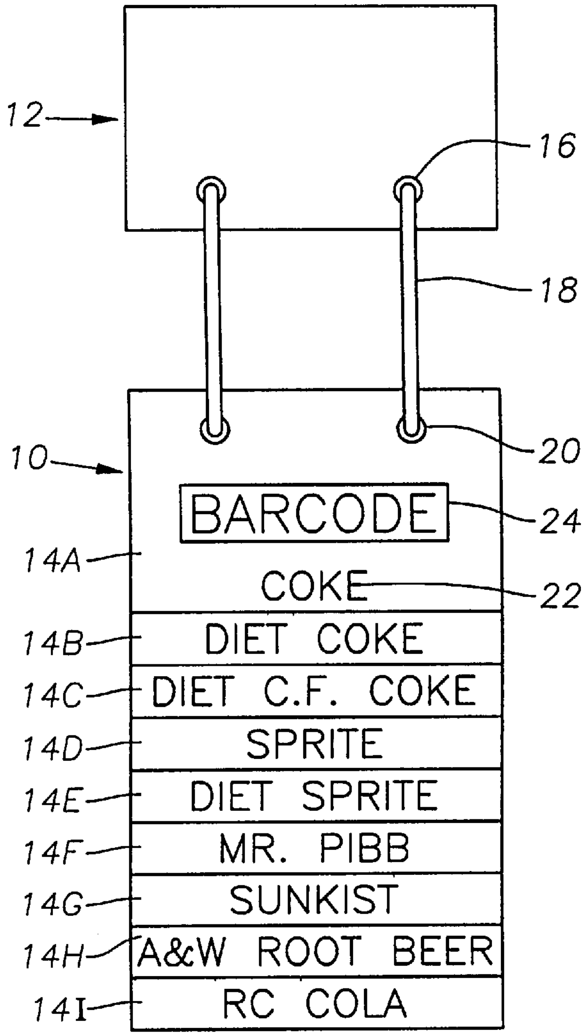
FIG. 1 is a front view of a device used in the method of the invention.

FIG. 1 shows a device 10 used in carrying out the method of the invention. The device 10 is a booklet having an attachment or hanger member 12 for holding a plurality of individual scan cards, such as cards 14A through 14I. The attachment member 12 can be a magnet or any suitable object to which the scan cards 14 can be pivotally attached.

Figure 2:
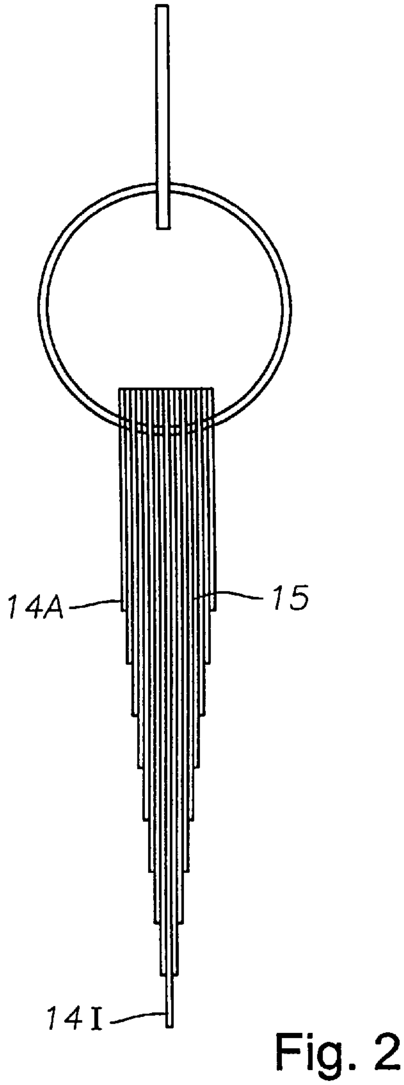
FIG. 2 is a side view of the device of FIG. 1.

In the particular embodiment shown, the attachment member 12 is provided with holes 16 which carry a pair of laterally spaced apart rings 18, such as those used in notebook binders and the like. Each of the scan cards 14A through 14I has a pair of holes 20 which are also laterally spaced apart a distance corresponding to the holes 16 of the attachment member 12. The holes 20 are spaced from the upper edge of each scan card 14A–14I an equal distance so that the upper edges of the scan cards 14A–14I are flush and even when bound by means of the binder rings 18, as shown in FIG. 2. Each of the scan cards 14 is pivotally moveable about the rings 18 attached to the attachment member 12. This allows each scan card 14 of the booklet 10 to fold out or be fully exposed. Alternately, scan cards 14 may be bound together at the upper end in tablet form by means of adhesive or the like.

The scan cards 14 may be formed from a variety of materials such as paper or plastic. If paper is used, the paper may be laminated in plastic so that it is not damaged or torn from frequent use. The scan cards 14 may be different colors or be printed with different colors to help quickly identify the individual scan cards.

As can be seen from FIG. 1, the scan cards 14A through 14I have the same width, but vary in length. When the cards 14A–14I are secured to the attachment member 12 by means of the rings 18, and oriented in increasing lengths, they overlap one another. A bottom tab portion 20 of each overlapped card 14 extends a selected distance beyond the adjacent overlaying card when the cards of the device 10 are in a closed position. For example, the scan card 14B is positioned beneath the first scan card 14A the bottom tab portion 20 of scan card 14B projects beyond the scan card 14A a slight distance so that it is exposed to view. In turn, scan card 14B overlays scan card 14C, which is slightly longer than scan card 14B, with the bottom tab portion 20 of scan card 14C projecting beyond scan card 14B a slight distance. This is repeated for each scan card. Further, from FIG. 2 it can be seen that this same configuration is repeated with opposite facing scan cards 14'.

As can be seen, each scan card 14 has a single product name 22 printed on the tab or exposed portion 20 of the scan card. The product name 22 or other identifying information, such as a symbol, should be easily viewed without having to open the device 10 or otherwise lift the adjacent overlaying scan cards 14. A bar code 24 is printed on each card above identifier 22. Each bar code 24 corresponds to the identifying information for each product indicated by the product name 22.

Blank scan cards 14 may also be used with the bar code 24 and identifier 22 being an adhesive bar code that can removed and replaced with another. Thus, booklet 10 can be used over again for a variety of different products without having to prepare new scan cards. This has particular application when there is a change in suppliers or products or where seasonal items are sold during certain times of the year.

Figure 3:
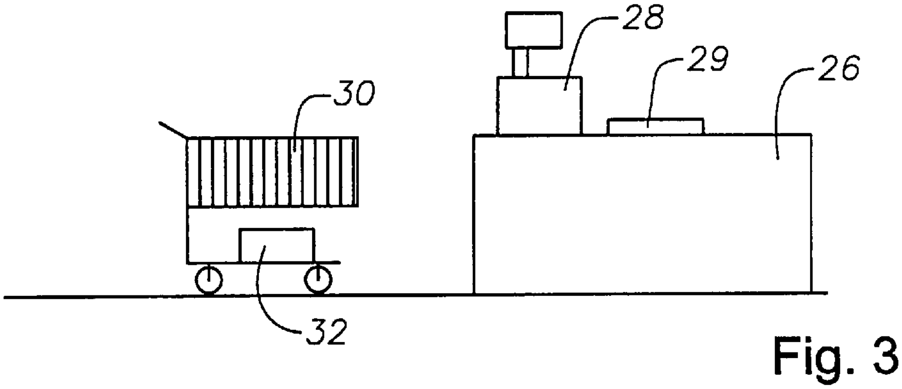
FIG. 3 is a schematic of a conventional check-out stand and grocery cart carrying a bulky item.
Figure 4:
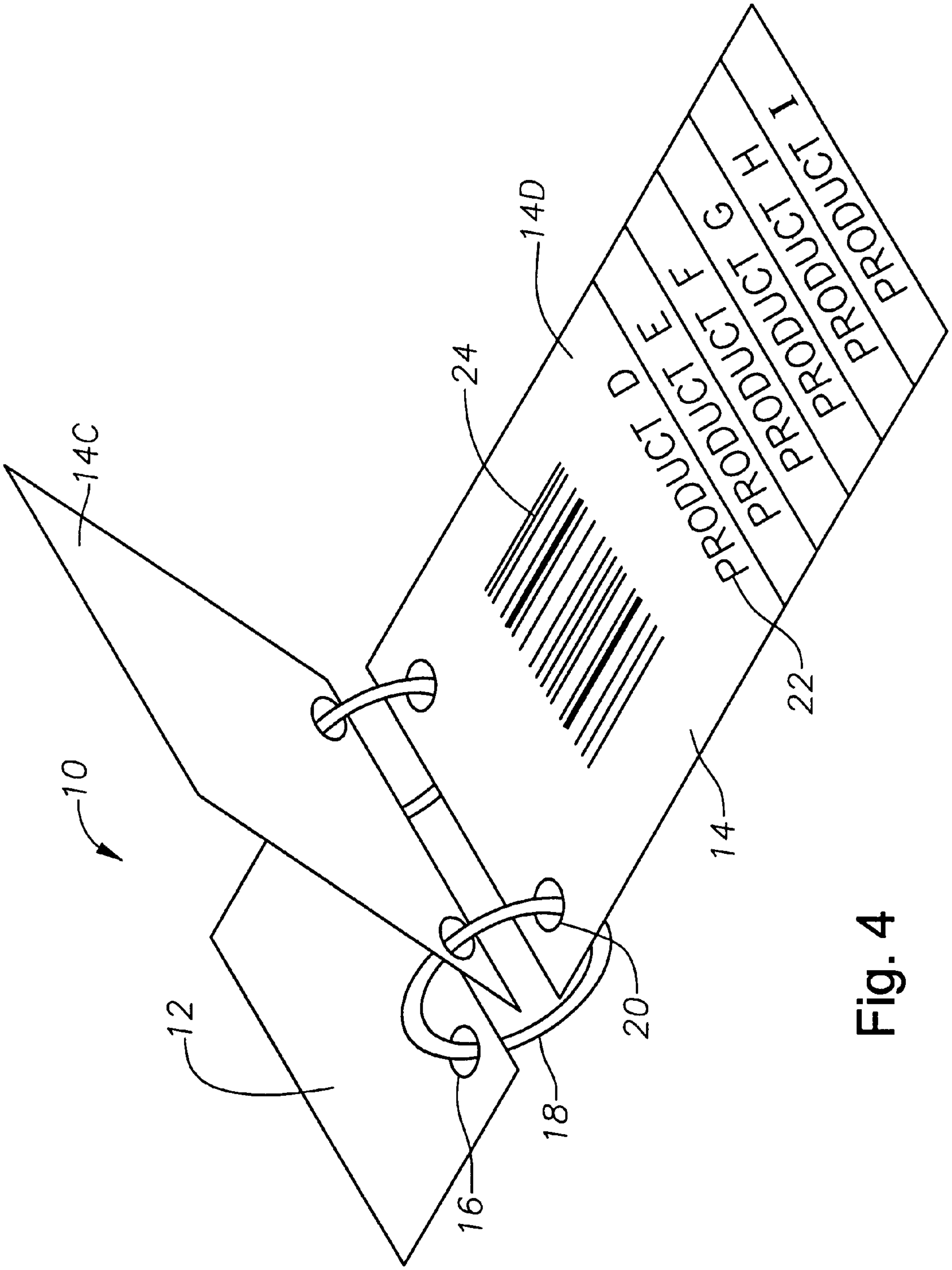
FIG. 4 is a perspective view of the device of FIGS. 1 and 2 shown with some scan cards of the device in a raised position.

With reference to FIGS. 3 and 4, the method of the invention is carried out as follows. FIG. 3 shows a schematic of a check-out counter 26 with an attached register 28 having conventional scanning equipment, such as a stationary countertop bar code scanner 29. Booklet 10 should be located at a position from which it can be easily accessible to the clerk operating register 28. If the attachment member 12 is magnetized, it can be removably attached to ferrous materials of the counter 26 for storing the device 10 and easily detached when booklet 10 is needed and later replaced.

A grocery cart 30 (FIG. 3) carrying a large or bulky item 32 is first identified by the clerk. Normally, item 32 will be marked with a bar code by the manufacturer, but because of its weight or size, lifting it onto counter 26 will not be feasible. For example, the item 32 may correspond to Product D for which indicia is printed on scan card 14D. When the bulky item 32 is identified, the clerk refers to booklet 10 and chooses the appropriate scan card 14, in this case scan card 14D. As previously discussed, the scan card may be color coded for quick identification. If necessary, the clerk refers to the product name 22.

Once the appropriate scan card is identified, the clerk opens booklet 10 and folds out scan card 14D so that the bar code 24 is revealed. In this case, the scan cards 14A–14C adjacent to card 14D are lifted by pivoting them about the rings 18 which bind the cards 14 to the attachment member 12. This uncovers the bar code 24 on scan card 14D as shown in FIG. 4. The user then passes the revealed bar code 24 of scan card 14D over scanning device 29, which provides cost and item information to register 28. The item 32 remains in the cart 30.

The invention has significant advantages. The booklet of cards is easy and inexpensive to make. The device avoids the need for the clerk to lift the heavier, bulkier items. This allows the products or items to be scanned more quickly and easily and with less effort. The clerk need not bend over for access to heavy items on the lower shelf of the cart. With retail stores having stationary countertop bar code scanners, there is no need to add a wand or gun type scanner.

While the invention has been shown in only one of its forms, it should be apparent to those skilled in the art that it is not so limited but is susceptible to various changes without departing from the scope of the invention.

I claim:

1. A method of checking out bulky products at a retail check-out counter having a stationary countertop bar code scanner, comprising:

(a) providing a plurality of cards;

(b) placing on each of the cards a bar code and an identifier corresponding to one of the bulky products; and (c) when a bulky product is brought by a purchaser to the check-out counter, moving the card which corresponds to said bulky product over the scanner.

2. The method according to claim 1, wherein steps (a) and (b) further comprise binding a plurality of the cards together in an assembly which allows each of the cards to be folded out and exposed from the other of the cards.

3. The method according to claim 1, wherein placing the identifier of step (b) comprises placing a name of the product.

4. The method according to claim 1, wherein:

step (a) comprises providing the cards with tabs;

step (b) comprises assembling the cards together in a booklet with the cards overlying one another and the tabs exposed; and placing the identifier of step (b) comprises placing a name of the product on the tab.

5. The method according to claim 1, wherein step (b) comprises for each of the cards placing the bar code and the identifier on an adhesive label and securing the label to the card.

6. A method of checking out bulky products at a retail check-out counter having a bar code scanner, comprising:

(a) binding first and second cards, each having a tab, into a booklet with the tabs exposed, the booklet allowing each of the cards to be folded out relative to each other;

(b) placing on the first and second cards a bar code corresponding to first and second bulky products, respectively;

(c) placing on the tabs of the first and second cards a name or symbol corresponding to the first and second bulky products, respectively; and (d) loading the first bulky product into a cart and bringing it to the check-out counter; and (e) identifying the first card by reading the tabs, then folding the first card out from the second card and moving the first card over the bar code scanner while the first bulky product remains in the cart.

7. The method according to claim 6, wherein step (b) comprises for each of the cards placing the bar code and the name or symbol on an adhesive label and securing the label to the card.

8. An apparatus for facilitating checking out bulky products at a retail counter having a bar code scanner, comprising:

a plurality of cards assembled into a booklet which allows each of the cards to overlie one another and to be folded out from the booklet;

a bar code symbol on each of the cards corresponding to a bulky product; and an identifier on each of the cards identifying the bulky product which corresponds to the bar code on the same card.

9. The apparatus according to claim 8, further comprising a tab on each of the cards which is exposed while the cards are overlying one another; and wherein the identifier is placed on the tab.

10. The apparatus according to claim 8, wherein the bar codes and the identifiers are placed on adhesive labels and secured to the cards.

* * * * *